(12) United States Patent
Yokoi

(10) Patent No.: US 9,445,142 B2
(45) Date of Patent: Sep. 13, 2016

(54) INFORMATION PROCESSING APPARATUS AND CONTROL METHOD THEREOF

(71) Applicant: CANON KABUSHIKI KAISHA, Tokyo (JP)

(72) Inventor: Mayu Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/328,040

(22) Filed: Jul. 10, 2014

(65) Prior Publication Data

US 2015/0026751 A1    Jan. 22, 2015

(30) Foreign Application Priority Data

Jul. 18, 2013    (JP) .................................. 2013-149933

(51) Int. Cl.
| | |
|---|---|
| *H04N 7/173* | (2011.01) |
| *H04N 21/262* | (2011.01) |
| *H04N 21/442* | (2011.01) |
| *H04N 21/2187* | (2011.01) |
| *H04N 21/24* | (2011.01) |
| *H04N 21/6373* | (2011.01) |
| *H04N 21/845* | (2011.01) |

(52) U.S. Cl.
CPC .... *H04N 21/26258* (2013.01); *H04N 21/2187* (2013.01); *H04N 21/2402* (2013.01); *H04N 21/44209* (2013.01); *H04N 21/6373* (2013.01); *H04N 21/8456* (2013.01)

(58) Field of Classification Search
USPC ........................................................ 725/131
See application file for complete search history.

(56) References Cited

U.S. PATENT DOCUMENTS

| | | | |
|---|---|---|---|
| 2010/0092095 A1* | 4/2010 | King et al. ................... | 382/229 |
| 2013/0290402 A1 | 10/2013 | Gavade et al. | |
| 2014/0019635 A1* | 1/2014 | Reznik ................. | H04L 65/607 |
| | | | 709/231 |

FOREIGN PATENT DOCUMENTS

| | | |
|---|---|---|
| JP | 10-164537 A | 6/1998 |
| JP | 2011-244097 A | 12/2011 |

OTHER PUBLICATIONS

The above patent document was cited in a Sep. 17, 2015 Office Action, that issued in related U.S. Appl. No. 14/328,019.

* cited by examiner

*Primary Examiner* — Pankaj Kumar
*Assistant Examiner* — Charles N Hicks
(74) *Attorney, Agent, or Firm* — Cowan, Liebowitz & Latman, P.C.

(57) ABSTRACT

An information processing apparatus which communicates with an image capturing apparatus and reproduces video data obtained by the image capturing apparatus, comprises a unit which requests a segment list in which information of segments of video data is written; a unit which acquires the requested segment list; a unit which decides which segment, from the segments in the acquired segment list to request; a unit which requests the decided segment from the image capturing apparatus; a unit which acquires the requested segment; and a unit which calculates a delay time for segment transmission based on a number of segments in the segment list.

17 Claims, 8 Drawing Sheets

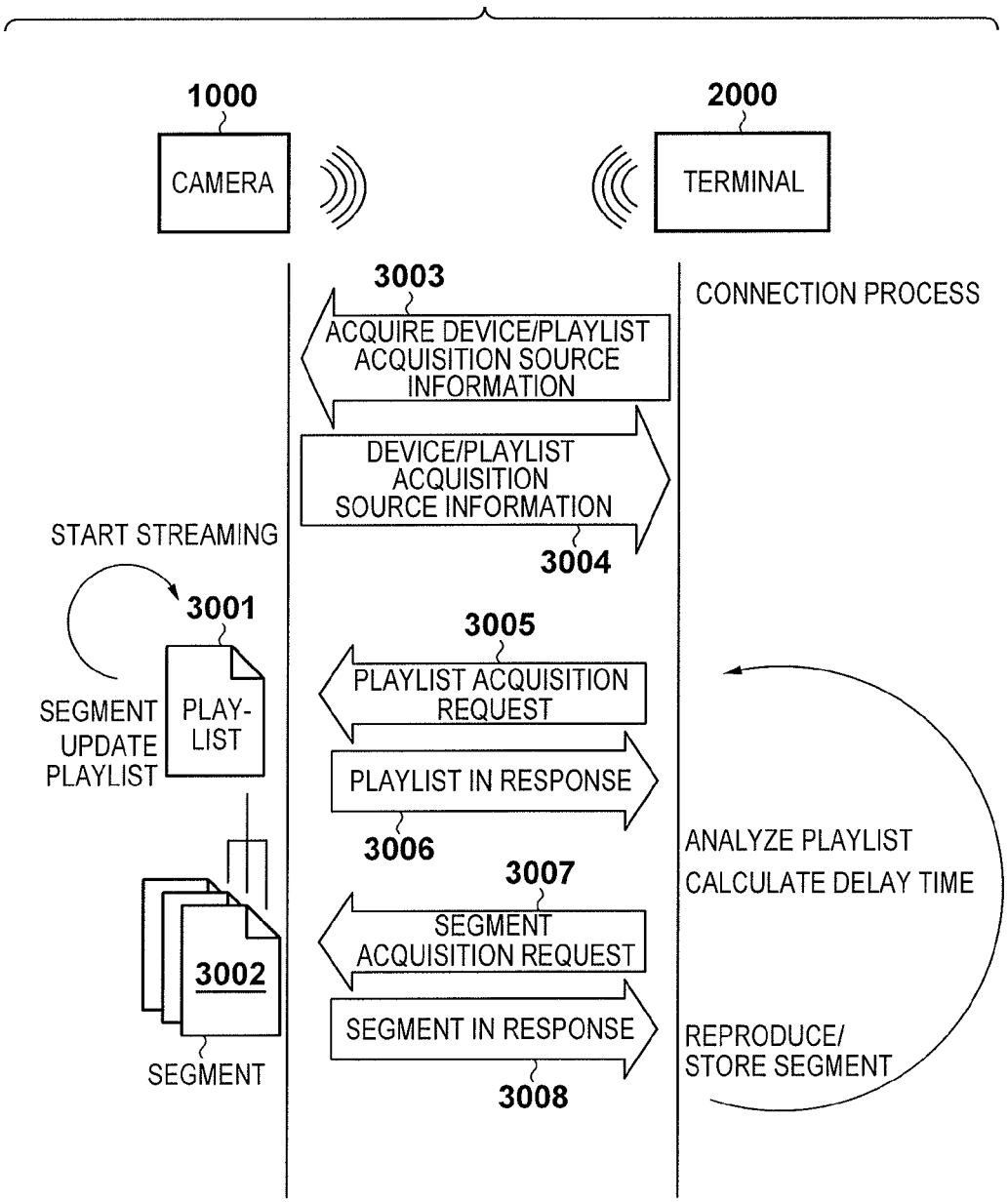

INFORMATION PROCESSING APPARATUS AND CONTROL METHOD THEREOF

BACKGROUND OF THE INVENTION

1. Field of the Invention

The present invention relates to the transmission of data between two devices via a network.

2. Description of the Related Art

A method for executing streaming data transfer using Hypertext Transfer Protocol (HTTP)/Transmission Control Protocol (TCP), which have conventionally been used for file transfer, is known as a conventional technique for streaming. Depending on the state of the network, delay may occur due to congestion when streaming using this method. Accordingly, there is a technique that calculates a normal reproduction time of video packets held in a client buffer based on a frame number and a frame rate and furthermore computes a total reproduction time for the contents of the buffer, and determines a video reproduction speed in accordance with the lengths of the times (Japanese Patent Laid-Open No. 2011-244097).

However, according to Japanese Patent Laid-Open No. 2011-244097, the delay time is calculated taking into account only the buffer in the client (video reproduction terminal), and cannot calculate the delay time taking into account the state in a video distribution server.

SUMMARY OF THE INVENTION

The present invention has been made in consideration of the aforementioned problems, and realizes a technique for calculating a delay time taking into account the state of a server when viewing streaming content.

In order to solve the aforementioned problems, the present invention provides an information processing apparatus which has a communication unit configured to communicate with an image capturing apparatus, and which reproduces video data obtained by sequentially acquiring segments indicating divisional data of the video data obtained by image capturing of the image capturing apparatus, the information processing apparatus comprising: a list requesting unit configured to request, via the communication unit, a segment list in which information of segments of video data being captured by the image capturing apparatus is written, from the image capturing apparatus; a list acquiring unit configured to acquire the segment list requested by the list requesting unit; a deciding unit configured to decide which segment, from the segments in the segment list acquired by the list acquiring unit, to request; a segment requesting unit configured to request, via the communication unit, the segment decided on by the deciding unit, from the image capturing apparatus; a segment acquiring unit configured to acquire the segment requested by the segment requesting unit; and a calculating unit configured to calculate a delay time for segment transmission based on a number of segments in the segment list.

In order to solve the aforementioned problems, the present invention provides an information processing apparatus which has a communication unit configured to communicate with an image capturing apparatus, and which reproduces video data obtained by sequentially acquiring segments indicating divisional data of the video data obtained by image capturing of the image capturing apparatus, the information processing apparatus comprising: a list requesting unit configured to request, via the communication unit, a segment list in which information of segments of video data being captured by the image capturing apparatus is written, from the image capturing apparatus; a list acquiring unit configured to acquire the segment list requested by the list requesting unit; a deciding unit configured to decide which segment, from the segments in the segment list acquired by the list acquiring unit, to request; a segment requesting unit configured to request, via the communication unit, the segment decided on by the deciding unit, from the image capturing apparatus; a segment acquiring unit configured to acquire the segment requested by the segment requesting unit; a determination unit configured to determine a delay level for transmission of the segment based on a number of segments in the segment list; and a notification unit configured to provide a notification of the delay level determined by the determination unit.

In order to solve the aforementioned problems, the present invention provides a control method of an information processing apparatus which has a communication unit configured to communicate with an image capturing apparatus, and which reproduces video data obtained by sequentially acquiring segments indicating divisional data of the video data obtained by image capturing of the image capturing apparatus, the method comprising: a list requesting step of requesting, via the communication unit, a segment list in which information of segments of video data being captured by the image capturing apparatus is written, from the image capturing apparatus; a list acquiring step of acquiring the segment list requested in the list requesting step; a deciding step of deciding which segment, from the segments in the segment list acquired in the list acquiring step, to request; a segment requesting step of requesting, via the communication unit, the segment decided on in the deciding step, from the image capturing apparatus; a segment acquiring step of acquiring the segment requested in the segment requesting step; and a calculating step of calculating a delay time for segment transmission based on a number of segments in the segment list.

In order to solve the aforementioned problems, the present invention provides a control method of an information processing apparatus which has a communication unit configured to communicate with an image capturing apparatus, and which reproduces video data obtained by sequentially acquiring segments indicating divisional data of the video data obtained by image capturing of the image capturing apparatus, the method comprising: a list requesting step of requesting, via the communication unit, a segment list in which information of segments of video data being captured by the image capturing apparatus is written, from the image capturing apparatus; a list acquiring step of acquiring the segment list requested in the list requesting step; a deciding step of deciding which segment, from the segments in the segment list acquired in the list acquiring step, to request; a segment requesting step of requesting, via the communication unit, the segment decided on in the deciding step, from the image capturing apparatus; a segment acquiring step of acquiring the segment requested in the segment requesting step; a determination step of determining a delay level for transmission of the segment based on the number of segments in the segment list; and a notification step of providing a notification of the delay level determined in the determination step.

According to the present invention, a delay time can be calculated taking into account the state of a server when viewing streaming content.

Further features of the present invention will become apparent from the following description of exemplary embodiments (with reference to the attached drawings).

BRIEF DESCRIPTION OF THE DRAWINGS

FIG. 3 is a diagram illustrating live streaming operations in a system according to the embodiment.

DESCRIPTION OF THE EMBODIMENTS

Figure 1:
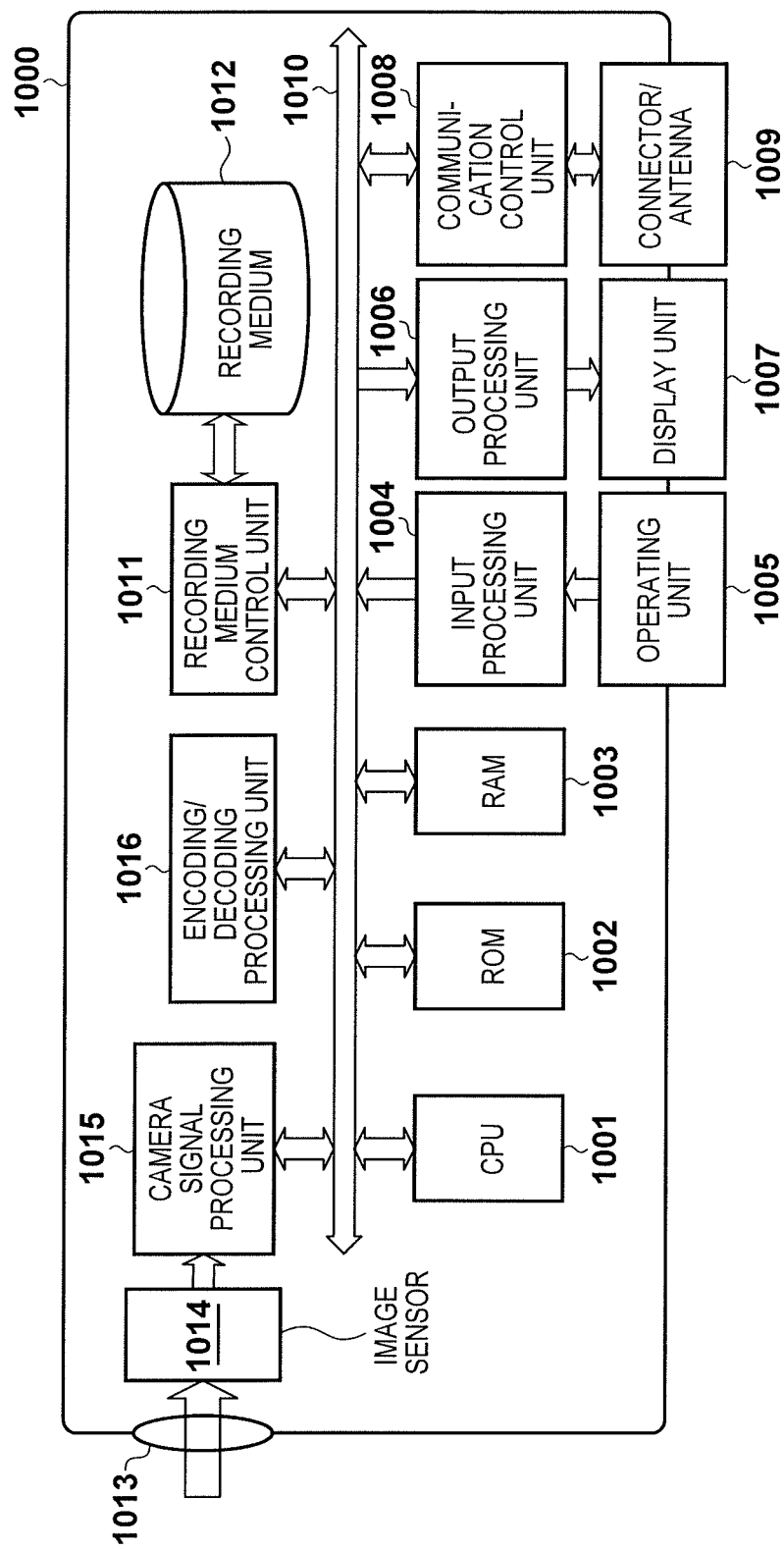
FIG. 1 is a block diagram illustrating an example of the configuration of an image capturing apparatus according to an embodiment of the present invention.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, the present invention will be described using a system in which an image capturing apparatus 1000 serving as a server and a communication apparatus 2000 serving as a client are communicably connected as an example. In this example, video captured by the image capturing apparatus 1000 is transmitted sequentially in real time, which enables the video to be streamed live and viewed in the communication apparatus 2000. Live streaming will be described in detail later. Although the present embodiment describes an example in which the image capturing apparatus 1000 is applied in a digital video camera and the communication apparatus 2000 is applied in a communication terminal such as a smartphone, the present invention is not limited thereto. For example, the present invention can also be applied in a system in which the image capturing apparatus is a mobile phone, a portable media player such as a tablet terminal, or the like that includes a camera and the communication apparatus is an information processing apparatus such as a personal computer, a mobile phone, a tablet terminal, a television, or the like.

Configuration of Image Capturing Apparatus

An overview of the configuration and functions of the image capturing apparatus according to an embodiment of the present invention will be given with reference to FIG. 1.

In the image capturing apparatus ("camera" hereinafter) 1000 shown in FIG. 1, a central processing unit (CPU) 1001, a read-only memory (ROM) 1002, a random access memory (RAM) 1003, an input processing unit 1004, an output processing unit 1006, a communication control unit 1008, a recording medium control unit 1011, a camera signal processing unit 1015, and an encoding/decoding processing unit 1016 are connected to an internal bus 1010. The various units connected to the internal bus 1010 are capable of exchanging data with one another via the internal bus 1010.

The ROM 1002 stores various types of programs, settings data, and so on through which the CPU 1001 operates. The ROM 1002 also includes a flash memory or the like. The RAM 1003 stores programs, variables, temporary data for tasks, and so on required by the CPU 1001 during operation.

The CPU 1001 controls the various units of the camera 1000 using the RAM 1003 as a working memory, in accordance with programs stored in the ROM 1002 or in a recording medium 1012.

An optical system 1013 corresponds to an image capturing lens including a focusing mechanism, an aperture mechanism, and the like, and forms an optical image of a subject. An image sensor 1014 is configured of a CCD, a CMOS sensor, or the like, and includes an A/D converter; the image sensor 1014 converts the optical image into an analog electrical signal and then converts the analog electrical signal into a digital signal.

The camera signal processing unit 1015 performs predetermined resizing processes such as pixel interpolation/reduction, color conversion, various types of correction processes, and so on, on the digital signal obtained through the conversion performed by the image sensor 1014, under the control of the CPU 1001.

The encoding/decoding processing unit 1016 compresses and encodes the digital signal processed by the camera signal processing unit 1015 at a predetermined bitrate and in a predetermined format, or decodes compressed and encoded video data, under the control of the CPU 1001.

Although no particular configurations regarding audio are shown here, the configuration also includes a microphone, an A/D converter for digitizing an analog audio signal, and a unit for encoding digital data in the case where the video is to be distributed with audio. Of course, video data including audio is then generated by recording audio along with the video when recording video and then multiplexing the video and audio using the encoding/decoding processing unit 1016.

The input processing unit 1004 accepts user operations through an operating unit 1005, generates control signals based on those operations, and supplies the control signals to the CPU 1001. For example, the operating unit 1005 includes, as input devices for accepting user operations, a text information input device such as a keyboard, a pointing device such as a mouse or touch panel, and the like. The operating unit 1005 also includes a remotely-operable device such as an infrared light-based remote controller. Note that the "touch panel" mentioned here refers to an input device in which coordinate information is outputted based on locations on an input unit, configured as a flat surface, that have been touched. Through this, the camera 1000 can be caused to operate in accordance with user operations.

The output processing unit 1006 outputs a display signal for causing a display unit 1007 to carry out a display, based on display data such as a graphical user interface (GUI) generated by the CPU 1001 in accordance with a program.

Note that in the case where a touch panel is used as the operating unit 1005, the operating unit 1005 and the display unit 1007 can be configured as a single integrated unit. For example, the touch panel is configured having a light transmissibility that does not interfere with the display of the display unit 1007, and is attached to the upper layer of a display surface of the display unit 1007. An input coordinate system of the touch panel is then associated with a display coordinate system of the display unit 1007. This makes it possible to configure a GUI that makes the user feel as if he or she is actually directly manipulating the screen displayed in the display unit 1007.

The recording medium control unit 1011 is connected to the recording medium 1012, which is an HDD, a non-volatile semiconductor memory, or the like, and reads out data from the connected recording medium 1012, writes data to the recording medium 1012, and so on under the control of the CPU 1001. Note that the recording medium 1012 that can be connected to the recording medium control unit 1011 may also include a removable non-volatile semiconductor memory such as a memory card that is connected via a socket or the like (not shown).

In addition to captured video data, the recording medium 1012 can also record information required for control performed by the CPU 1001.

The communication control unit 1008 communicates with the communication apparatus 2000 and other external apparatuses via a connector (wired)/antenna (wireless) 1009, under the control of the CPU 1001. IEEE 802.11, Bluetooth (registered trademark), and the like for wireless connections, and IEEE 802.3 and the like for wired connections, can be used as the method for communication.

Note that the hardware configuration is not limited to that shown in FIG. 1; for example, a single piece of hardware may carry out display control, communication control, recording control, image processing control, and so on, and function as the various units of the camera 1000. Likewise, a plurality of pieces of hardware may operate in tandem to function as a single unit.

Configuration of Communication Apparatus

Next, an overview of the configuration and functions of the communication apparatus according to the embodiment of the present invention will be given with reference to FIG. 2.

Figure 2:
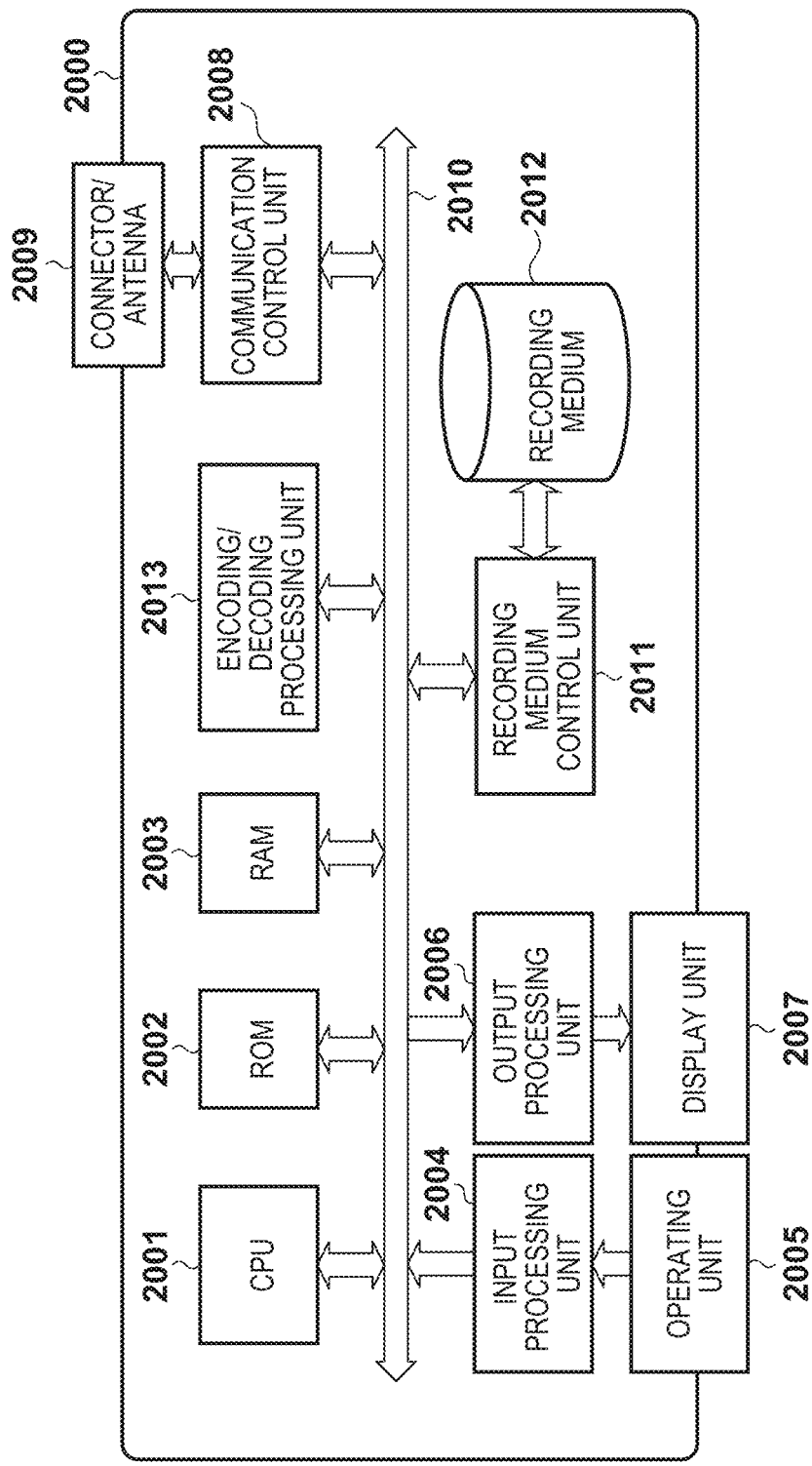
FIG. 2 is a block diagram illustrating an example of the configuration of a communication apparatus according to the embodiment of the present invention.

The communication apparatus ("terminal" hereinafter) 2000 shown in FIG. 2 is largely the same as the camera 1000, and thus descriptions of a CPU 2001 to a recording medium 2012, which are the same as the corresponding descriptions regarding the camera 1000, will be omitted. An encoding/decoding processing unit 2013 decodes compressed/encoded video data and re-encodes decoded data as necessary, under the control of the CPU 2001.

Live Streaming Operations

Next, live streaming operations performed by the system according to the present embodiment using a playlist will be described.

First, basic streaming operations performed by the system according to the present embodiment using a playlist will be described.

1. The camera (server) divides streaming data into segments of set amounts of time, and generates a playlist that lists acquisition sources of those segments. In the case of live streaming, the content is generated in real time, and thus the segments are generated periodically. Accordingly, live streaming uses a sliding window-type playlist in which when a new segment is generated, the playlist is updated (through deletion and addition) dynamically with the new content.

2. The terminal (client) acquires and analyzes the playlist, and obtains the data from the segment data acquisition sources in order of the stated listing.

3. The terminal (client) reproduces and displays or stores the acquired data.

4. The camera (server) and the terminal (client) repeat steps 1 to 3 until the playlist ends (the streaming ends).

Next, live streaming operations performing by the system according to the present embodiment using a playlist will be described with reference to FIGS. 1 to 3 and 8, in light of the basic operations described thus far.

When a user executes a live streaming mode in the camera 1000 using the operating unit 1005, the camera 1000 sets the communication control unit 1008 to a communicable state under the control of the CPU 1001.

Furthermore, a user of the terminal 2000 launches applications necessary for communication connection processing and live streaming processing by operating an operating unit 2005. In response to this, the CPU 2001 of the terminal 2000 controls a communication control unit 2008 to start communication with the camera 1000 and carry out a connection process, in accordance with the programs stored in a ROM 2002 or the recording medium 2012.

Here, it is assumed that the camera 1000 and the terminal 2000 employ Hypertext Transfer Protocol (HTTP)/Transmission Control Protocol (TCP) as the protocol for communication. The devices are also assumed to be Universal Plug and Play (UPnP)-compliant for the communication connection. Upon connecting to a network, the UPnP-compliant terminal 2000 sets an Internet Protocol (IP) address through the Dynamic Host Configuration Protocol (DHCP) or AutoIP. In order to discover other devices on the same network, the device that has acquired an IP address searches out other devices and acquires information such as the types of responding devices, service functions, and so on through "device discovery and control" (step 3003). In response to a device search request from the terminal 2000, the camera 1000 returns device information and device-unique information such as playlist acquisition source information (step 3004).

When the connection process between the camera 1000 and the terminal 2000 is complete, the camera 1000 starts live streaming.

Figure 8:
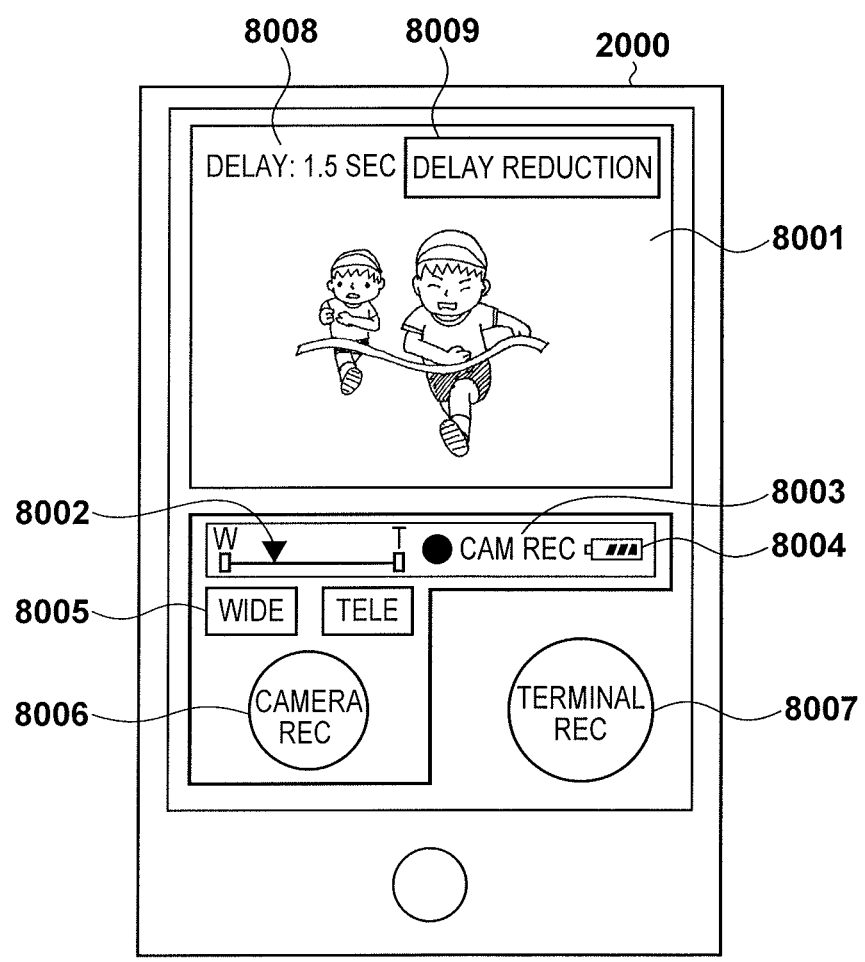
FIG. 8 is a diagram illustrating an example of a live streaming screen in the communication apparatus according to the embodiment.

FIG. 8 illustrates an example of an application screen in the terminal 2000 during live streaming, and shows an example in which the operating unit 2005 and a display unit 2007 are integrated as a single unit. Live streaming data is displayed in a display area 8001, and the status of the camera 1000 is indicated by zoom position information 8002, a recording state 8003, battery information 8004, a delay time 8008 (mentioned later), and so on. Zoom buttons 8005, camera REC 8006, terminal REC 8007, delay reduction 8009(mentioned later), and so on are provided as operable items.

During live streaming, the CPU 1001 of the camera 1000 starts the output of a signal from the image sensor 1014; the output is processed into appropriate video data by the camera signal processing unit 1015, after which the resulting data is sent to the encoding/decoding processing unit 1016.

Returning to FIG. 3, the encoding/decoding processing unit 1016 compresses and encodes the received video data and the like at a predetermined bitrate and in a predetermined format, divides the data into predetermined lengths of time Ts, and stores the lengths of time Ts in the RAM 1003 or the recording medium 1012 as segment data (3002). Note that the present embodiment assumes that Ts=0.5 seconds. Note also that a variety of methods for generating the segment data can be considered. One such method divides the video data into a plurality of segments having lengths of time corresponding to Ts upon receiving video data of a certain overall length of time. Another method generates segments sequentially, one at a time, each time video data of the length of time Ts is received. Regardless of which method is employed, a "segment" corresponds to video data that has been divided.

The CPU 1001 generates path information associated with a storage location of the stated segment data. The path information is used by the terminal 2000 as acquisition source information when acquiring segments, and the CPU 1001 generates a playlist 3001 and records segment information along with the path information.

The playlist 3001 will now be described with reference to FIGS. 4A-4B.

Figure 4A:
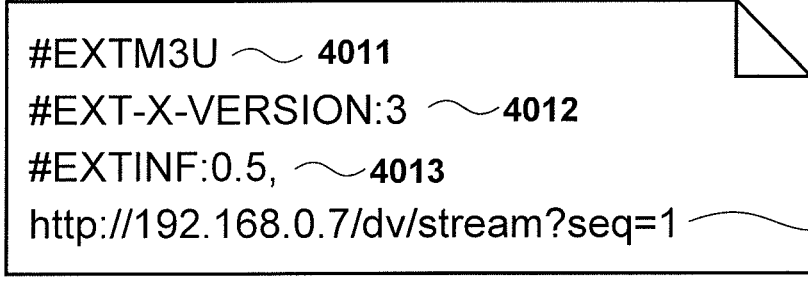
FIGS. 4A to 4C are diagrams illustrating examples of playlists according to the embodiment.

A playlist 4010 shown in FIG. 4A is a playlist in the Extended M3U format, and an identifier tag is written in a first line 4011, whereas a tag indicating a playlist version as well as the version of the playlist are written in a second line 4012. In this example, the version is "3". A tag indicating the time of segment data 3002, and an integer or decimal indicating that time (in seconds), are written in a third line 4013. In the present embodiment, the segment data time length Ts=0.5 (seconds), and thus "0.5" is written in this example. An acquisition source path (including query parameters) of the segment data 3002 is written in a fourth line 4014. It is absolutely necessary for the third line 4013 and the fourth line 4014 to be written consecutively as information regarding the segment data 3002.

The playlist 4010 serves as an example of the details of the playlist 3001 shown in FIG. 3, in which the segment information 4013 and 4014 have been recorded.

The terminal 2000 stores the predetermined length of time Ts of the segment data 3002 in advance, or obtains that length of time Ts when acquiring the device information of the camera 1000 by that length of time Ts being included in the device information.

Approximately Ts (seconds) after starting live streaming, the terminal 2000 makes a playlist acquisition request (HTTP GET method) to the playlist acquisition source acquired in step 3004 (step 3005).

The camera 1000 transmits the playlist 3001 in which a single instance of the segment information 4013 and 4014 (that is, the playlist 4010) is written as the playlist for the response (step 3006).

The terminal 2000 analyzes the received playlist 4010 and calculates a delay time. The terminal 2000 also analyzes the received playlist 4010 and makes a segment acquisition request (HTTP GET method) to the source from which the segment information was acquired (step 3007).

The camera 1000 transmits the requested segment 3002 as the segment for the response (step 3008).

The terminal 2000 passes the received segment 3002 to the encoding/decoding processing unit 2013, and after decoding, reproduces and displays the segment in the display unit 2007 via an output processing unit 2006. In addition, when the user inputs an instruction to terminal REC 8007 using the live streaming application, the decoded data or a data portion of the segment 3002 excluding the header and so on thereof is recorded into the recording medium 2012. The segment data received sequentially thereafter is linked to the already-received data and recorded as well.

During streaming, the camera 1000 generates a segment approximately every Ts (seconds) and updates the playlist. The segment information acquired from the terminal 2000, meanwhile, is deleted from the playlist.

Each time the playlist is updated in the camera 1000, the terminal 2000 acquires the playlist approximately every Ts (seconds) (step 3005), and makes an acquisition request for that segment data based on the segment information denoted in the playlist 3001.

In the case where the state of communication is favorable, the series of processes from the playlist acquisition (step 3005) to the segment in response (step 3008) is carried out periodically. However, in actuality, this communication cannot be carried out periodically due to congestion or the like. FIG. 4B illustrates an example of a playlist 4020 that includes a period of congestion. Three pieces of segment information are written in the playlist 4020.

Note that in the request process performed by the terminal 2000 (step 3005 and 3007), a unique ID of the terminal or the application is added. Then, the camera 1000 according to the present embodiment streams the data only in response to the ID from which the first request was received. In other words, the camera 1000 and the terminal 2000 according to the present embodiment only carry out streaming over a one-to-one connection.

System Operations

Figure 5:
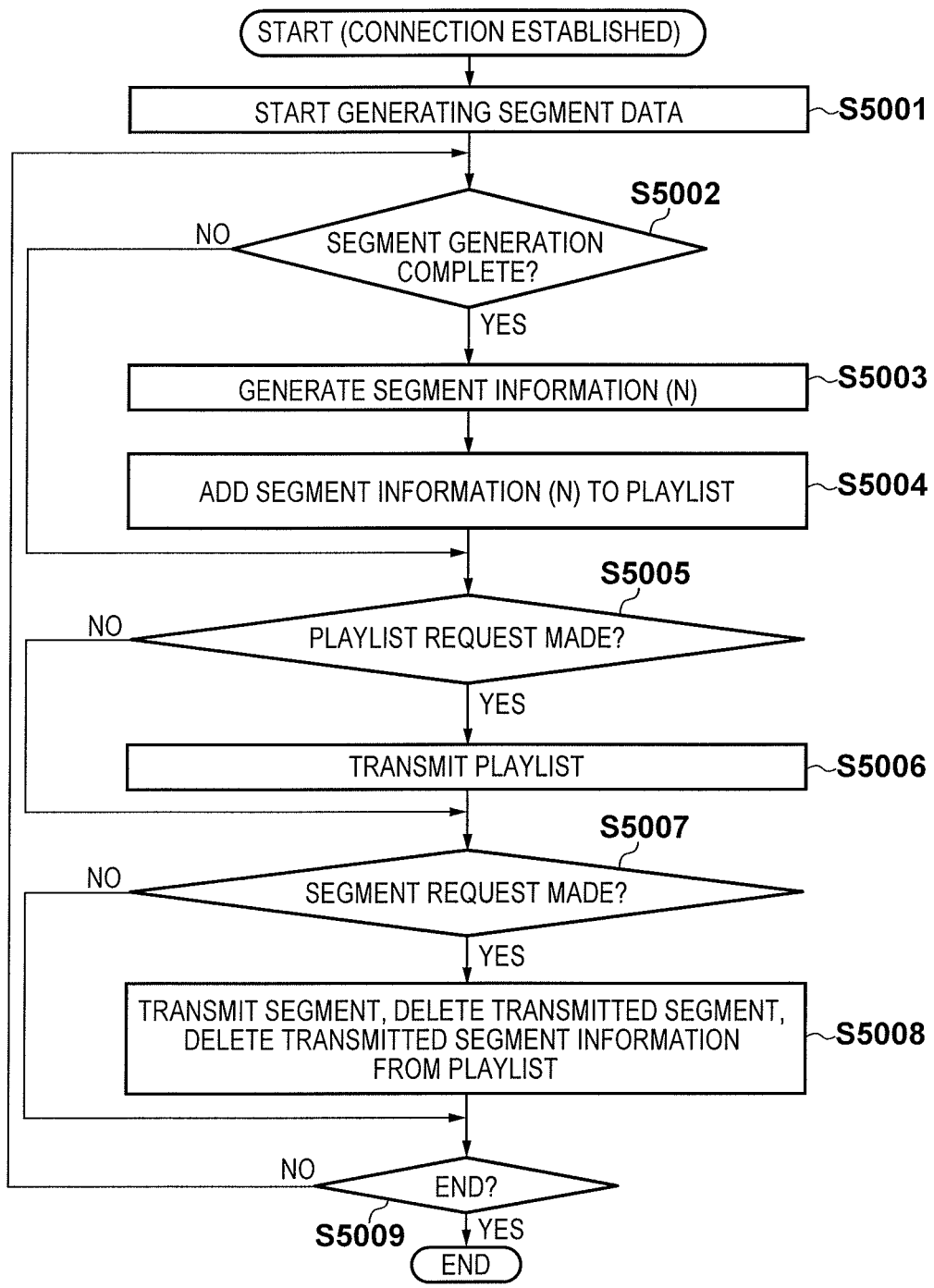
FIG. 5 is a flowchart illustrating operations performed by the image capturing apparatus according to the embodiment.
Figure 6:
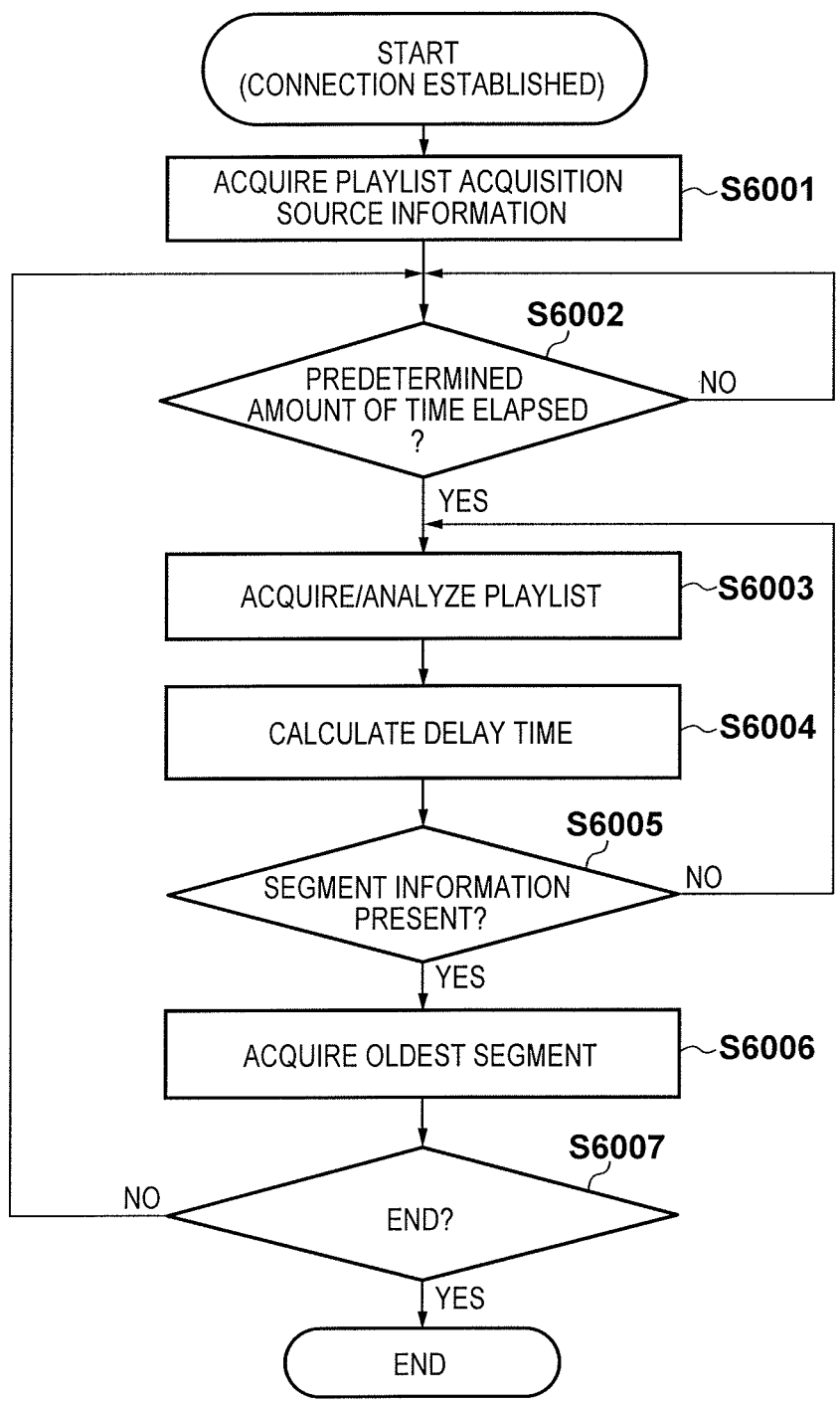
FIG. 6 is a flowchart illustrating operations performed by the communication apparatus according to the embodiment.

Next, operations performed by the camera 1000 and the terminal 2000 that configure the system according to the present embodiment will be described with reference to FIGS. 5 and 6.

First, processes executed by the camera 1000 after a connection has been established between the camera 1000 and the terminal 2000 will be described with reference to FIG. 5. Note that the processes described hereinafter are realized by the CPU 1001 of the camera 1000 controlling the respective units of the camera 1000 based on various types of programs, input signals, and so on.

In step S5001, a process for starting the generation of segment data is executed for starting the live streaming. The CPU 1001 starts the output of a signal from the image sensor 1014; the output is processed into appropriate video data by the camera signal processing unit 1015, after which the resulting data is passed to the encoding/decoding processing unit 1016. The encoding/decoding processing unit 1016 compresses and encodes the received video data at a predetermined bitrate and in a predetermined format, and furthermore starts a process for dividing the data into the predetermined lengths of time Ts (0.5 seconds, in the present embodiment).

In step S5002, it is determined whether or not the generation of a single segment (0.5 seconds) is complete. It is confirmed whether the 0.5 seconds' worth of divided data has been temporarily stored in the RAM 1003 or the recording medium 1012; in the case where the data has been stored, the process advances to step S5003, whereas in the case where the data has not been stored, the process advances to step S5005. Although this step is described as a determination based on an inquiry (polling), it is also possible to determine whether the generation is complete using a method such as detecting whether the divided segment data has been written and making an interrupt notification or the like.

In step S5003, the segment information is generated. The length of time of the generated segment data, as well as path information associated with a storage location address, a filename, or the like and enabling the segment data to be specified, are generated. In the present embodiment, the length of time of the segment is fixed at 0.5 seconds.

In step S5004, the segment information generated in step S5003 is added to the playlist.

In step S5005, it is determined whether or not a playlist acquisition request (step 3005) has been received from the terminal 2000. The process advances to step S5006 in the case where the playlist acquisition request has been received, and advances to step S5007 in the case where the playlist acquisition request has not been received.

In step S5006, the playlist is transmitted (step 3006) in response to the playlist acquisition request (step 3005).

In step S5007, it is determined whether or not a segment acquisition request (step 3007) has been received from the terminal 2000. The process advances to step S5008 in the case where the segment acquisition request has been received, and advances to step S5009 in the case where the segment acquisition request has not been received.

In step S5008, the corresponding segment is transmitted (step 3008) in response to the segment acquisition request (step 3007). The transmitted segment is then deleted, the information regarding the segment is deleted from the playlist, and the process advances to step S5009.

In step S5009, it is determined whether or not the process is complete, and the process returns to step S5002 in the case where the process is not complete.

Although the respective event determination steps S5002, S5005, and S5007 of this flow have been described as determinations made through sequential inquiries, the processes may be executed in the order at which the events occur in the case where the system simultaneously stands by for the events corresponding to the respective conditions.

Next, processes executed by the terminal 2000 after the terminal 2000 has established a connection with the camera 1000 will be described with reference to FIG. 6. Note that the processes described hereinafter are realized by the CPU 2001 of the terminal 2000 controlling the respective units of the terminal 2000 based on various types of programs, input signals, and so on.

In step S6001, the playlist acquisition source information is acquired from the device/playlist acquisition source information acquired when the connection was established (step 3004), and is stored.

In step S6002, it is determined whether or not a predetermined amount of time has elapsed. The process advances to step S6003 in the case where the predetermined amount of time has elapsed, whereas step S6002 is repeated in the case where the predetermined amount of time has not elapsed. Here, it is desirable for the "predetermined amount of time" to be the same value as that of the predetermined length of time Ts generated by the camera 1000.

In step S6003, the playlist acquisition request (step 3005) is carried out using the playlist acquisition source information acquired in step S6001, and the playlist acquired from the camera 1000 is analyzed. In the playlist analysis, the playlist format and version are confirmed using the identifier tag, after which the segment information is acquired.

In step S6004, the delay time is calculated through the following Formula (1), based on a result of analyzing the playlist acquired in step S6003.

$$\text{delay time} = \text{number of segments in playlist} \times \text{segment time length 0.5 seconds} \quad (1)$$

As indicated by Formula (1), in the present embodiment, the delay time is calculated based only on how many segments are held in the camera 1000, or in other words, based only on a delay that takes into account the state of the buffer in the camera 1000. However, the delay time may be calculated by adding delay occurring in other stages as well, in addition to the state of the buffer.

As an example of calculating the delay time, the delay time may be calculated taking into account both the state of the buffer in the camera 1000 and the state of the buffer in the device itself (the terminal 2000), for example. A case where a rendering process performed by the terminal 2000 is slower than a process for receiving the segments can be given as an example of a case where segments are retained in the buffer of the terminal 2000.

Note that it is also possible to pass a result of the calculation to the display unit 2007 and display the delay time 8008 as indicated in FIG. 8.

In step S6005, it is determined whether or not segment information was present in step S6003. The process advances to step S6006 in the case where the segment information was present, and returns to step S6003 in the case where the segment information was not present.

In step S6006, a segment acquisition request (step 3007) indicating the acquisition source path of the earliest segment information in the playlist is made, and a segment is acquired from the camera 1000. Here, if one piece of segment information has been acquired, the segment that is acquired is the earliest segment. Meanwhile, in the case where a plurality of pieces of segment information have been acquired, the oldest of the segments is taken as the earliest segment. The acquired segment is recorded into the RAM 2003 or the recording medium 2012, is passed to the encoding/decoding processing unit 2013 and decoded, and is then reproduced and displayed (displayed as video) in the display unit 2007 via the output processing unit 2006. In addition, in the case where terminal REC 8007 is executed through the live streaming application, the decoded data or the data portion of the segment excluding the header and so on thereof is stored in the recording medium 2012 using a different process from that illustrated in the flowchart of FIG. 6.

In step S6007, it is determined whether or not the process is complete, and the process returns to step S6002 in the case where the process is not complete.

Second Embodiment

Next, a second embodiment will be described.

The present embodiment describes an example in which buffer data is deleted from the camera 1000 in accordance with an instruction from the terminal 2000. Note that the system configuration in the present embodiment is the same as in the first embodiment and thus descriptions thereof will be omitted. Note also that the length Ts of the segment is the same 0.5 seconds as in the first embodiment.

In the live streaming screen shown in FIG. 8, a user can delete the buffer data at any time by touching delay reduction 8009 displayed in the display area 8001. Through this, the transmission of retained segments can be canceled and delay can be eliminated. Specifically, when the user presses delay reduction 8009, the CPU 2001 receives a deletion instruction from the input processing unit 2004, and makes a buffer data deletion request, that communicates different details than the playlist acquisition request and the segment acquisition request, via the communication control unit 2008.

Figure 7:
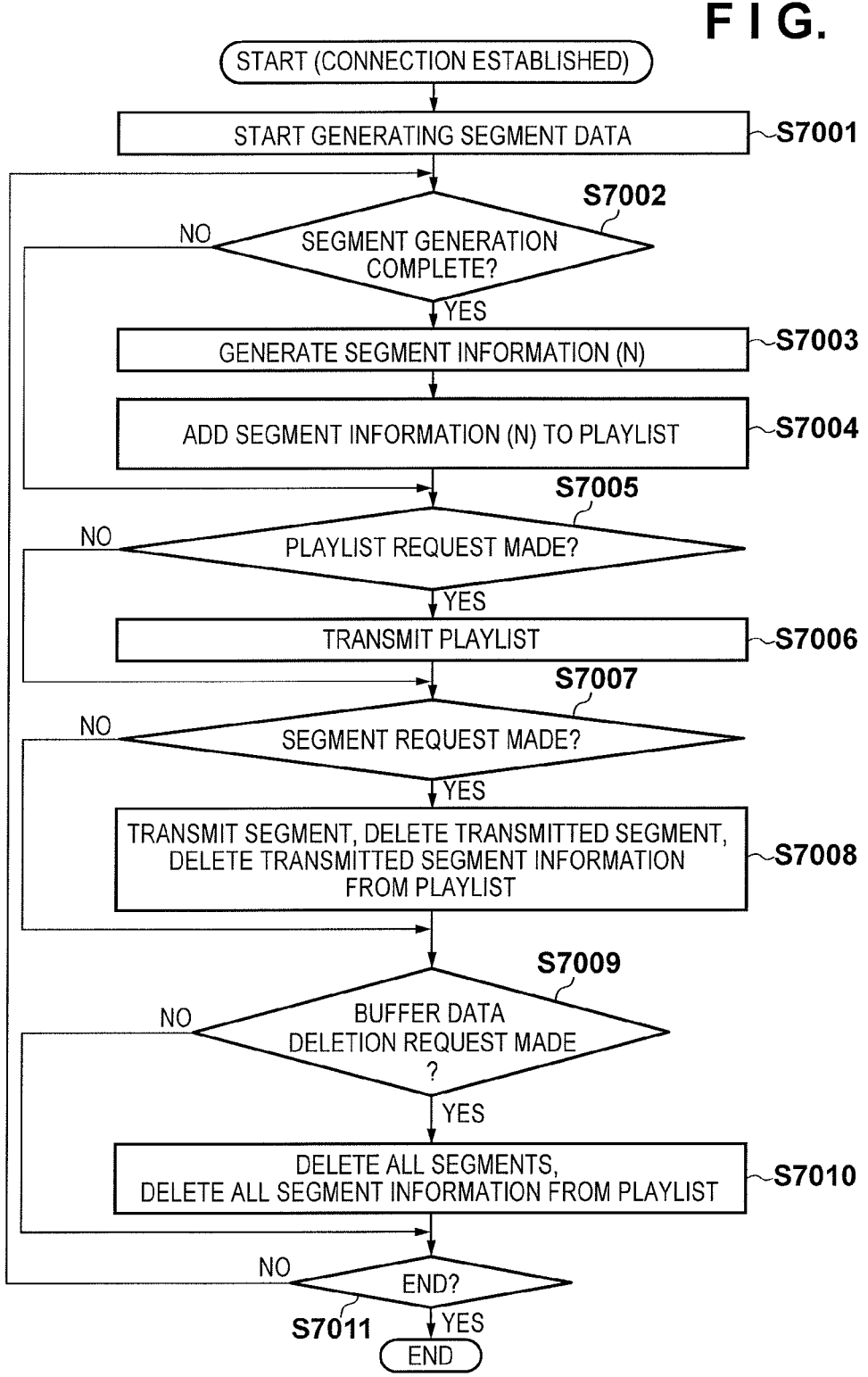
FIG. 7 is a flowchart illustrating operations performed by an image capturing apparatus according to a second embodiment.

FIG. 7 illustrates processing executed by the CPU 2001 after the terminal 2000 has established a connection with the camera 1000. Note that step S7001 to step S7008 in FIG. 7 execute the same processes as step S5001 to step S5008 in FIG. 5, and thus descriptions thereof will be omitted.

In step S7009, it is determined whether or not a buffer data deletion request has been received from the terminal 2000. The process advances to step S7010 in the case where the buffer data deletion request has been received, and advances to step S7011 in the case where the buffer data deletion request has not been received.

In step S7010, all of the segments are deleted, and the information of all the segments is deleted from the playlist.

Figure 4B:
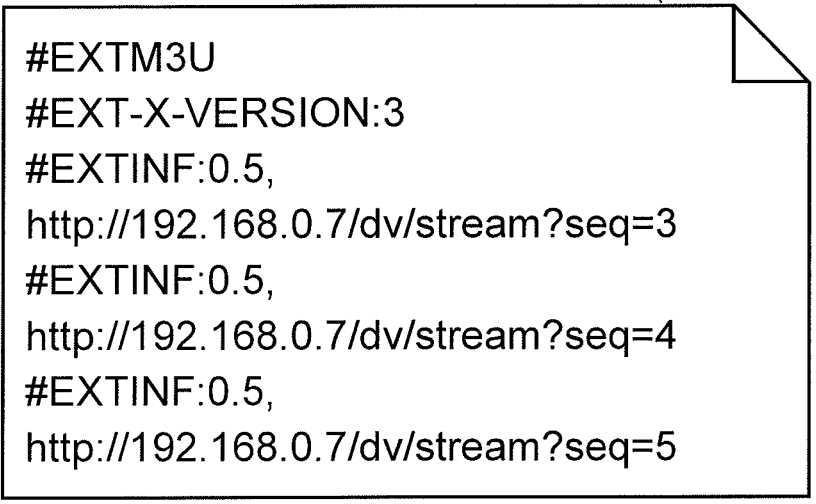
Figure 4C:
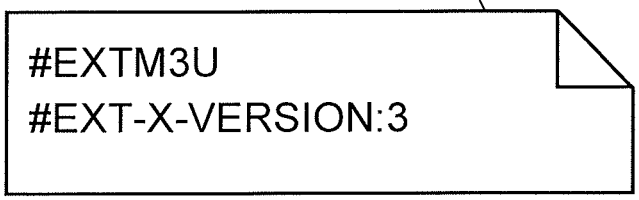

For example, the playlist 4020 shown in FIG. 4B is updated to a playlist 4030 shown in FIG. 4C.

In step S7011, it is determined whether or not to end the process. In the case where the process is not to be ended, the process returns to step S7002.

Although the respective event determination steps S7002, S7005, S7007, and S7009 of this flow have been described as determinations made through sequential inquiries, the processes may be executed in the order at which the events occur in the case where the system simultaneously stands by for the events corresponding to the respective conditions.

Note also that although the deletion request in the present embodiment specifies all of the data within the buffer, the embodiment is not limited thereto, and the configuration may be such that any desired amount of data can be specified.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiments of the present invention, and by a method performed by the computer of the system or apparatus by, for example, reading out and executing the computer executable instructions from the storage medium to perform the functions of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-149933, filed Jul. 18, 2013 which is hereby incorporated by reference herein in its entirety.

What is claimed is:

1. An information processing apparatus comprising:
a communication interface configured to communicate with an image capturing apparatus, and which reproduces video data obtained by sequentially acquiring segments indicating divisional data of the video data obtained by image capturing of the image capturing apparatus;
a memory storing a program;
a processor for executing the program stored in the memory, the processor, when executing the program, implementing functions of a list requesting function, a list acquiring function, a deciding function, a segment requesting function, a segment acquiring function, and a calculating function, wherein:
the list requesting function is configured to request, via the communication unit, a segment list in which information of segments of video data being captured by the image capturing apparatus is written, from the image capturing apparatus;
the list acquiring function is configured to acquire the segment list requested by the list requesting function;
the deciding function is configured to decide which segment, from the segments in the segment list acquired by the list acquiring function, to request;
the segment requesting function is configured to request, via the communication interface, the segment decided on by the deciding function, from the image capturing apparatus;
the segment acquiring function is configured to acquire the segment requested by the segment requesting function; and
the calculating function is configured to calculate a delay time for segment transmission based on a number of segments in the segment list.

2. The apparatus according to claim 1, further comprising a notification function configured to provide a notification of the delay time calculated by the calculating function, wherein the notification function is implemented by the processor.

3. The apparatus according to claim 1, further comprising a display controller configured to control a display to display a video based on the segment acquired by the segment acquiring function, wherein the display controller is implemented by the processor.

4. The apparatus according to claim 3, wherein the display controller controls the display to display the delay time calculated by the calculating function along with the video data based on the segment acquired by the segment acquiring function.

5. The apparatus according to claim 1, wherein the segment list includes a time of each segment; and
the calculating function calculates the delay time based on the number of segments in the segment list and the time of each segment.

6. An information processing apparatus comprising:
a communication interface configured to communicate with an image capturing apparatus, and which reproduces video data obtained by sequentially acquiring segments indicating divisional data of the video data obtained by image capturing of the image capturing apparatus;
a memory storing a program;
a processor for executing the program stored in the memory, the processor, when executing the program, implementing functions of a list requesting function, a list acquiring function, a deciding function, a segment requesting function, a segment acquiring function, a determination function, and a notification function, wherein
the list requesting function is configured to request, via the communication interface, a segment list in which information of segments of video data being captured by the image capturing apparatus is written, from the image capturing apparatus;
the list acquiring function is configured to acquire the segment list requested by the list requesting function;
the deciding function is configured to decide which segment, from the segments in the segment list acquired by the list acquiring function, to request;
the segment requesting function is configured to request, via the communication interface, the segment decided on by the deciding function, from the image capturing apparatus;

the segment acquiring function is configured to acquire the segment requested by the segment requesting function;

the determination function is configured to determine a delay level for transmission of the segment based on a number of segments in the segment list; and the notification function is configured to provide a notification of the delay level determined by the determination function.

7. The apparatus according to claim 6, further comprising a display controller configured to control a display to display a video based on the segment acquired by the segment acquiring function, wherein the display controller is implemented by the processor.

8. The apparatus according to claim 7, wherein the display controller controls the display to display the delay level determined by the determination function along with the video data based on the segment acquired by the segment acquiring function.

9. The apparatus according to claim 7, wherein the display controller controls the display to display an operation function for accepting user operations along with the video data based on the segment acquired by the segment acquiring function.

10. The apparatus according to claim 9, wherein the operation function includes at least one of an operation member for starting recording of the video data by the image capturing apparatus and an operation member for setting a zoom ratio in the image capturing apparatus.

11. The apparatus according to claim 9, wherein the operation function includes an operation member for recording, in a recording medium of the information processing apparatus, video data based on the segment acquired by the segment acquiring function.

12. The apparatus according to claim 9, wherein the operation function includes an operation member for reducing the delay level.

13. The apparatus according to claim 12, further comprising a transmitter for transmitting an instruction to delete at least some of untransmitted segments held in the image capturing apparatus in the case where the operation function for reducing the delay level has been operated.

14. A control method of an information processing apparatus comprising:
a communicating step of communicating, via a communication unit, with an image capturing apparatus, the communication unit configured to reproduce video data obtained by sequentially acquiring segments indicating divisional data of the video data obtained by image capturing of the image capturing apparatus;
a list requesting step of requesting, via the communication unit, a segment list in which information of segments of video data being captured by the image capturing apparatus is written, from the image capturing apparatus;
a list acquiring step of acquiring the segment list requested in the list requesting step;
a deciding step of deciding which segment, from the segments in the segment list acquired in the list acquiring step, to request;
a segment requesting step of requesting, via the communication unit, the segment decided on in the deciding step, from the image capturing apparatus;
a segment acquiring step of acquiring the segment requested in the segment requesting step; and a calculating step of calculating a delay time for segment transmission based on a number of segments in the segment list.

15. A control method of an information processing apparatus comprising:
a communicating step of communicating, via a communication unit, with an image capturing apparatus, the communication unit configured to reproduce video data obtained by sequentially acquiring segments indicating divisional data of the video data obtained by image capturing of the image capturing apparatus;
a list requesting step of requesting, via the communication unit, a segment list in which information of segments of video data being captured by the image capturing apparatus is written, from the image capturing apparatus;
a list acquiring step of acquiring the segment list requested in the list requesting step;
a deciding step of deciding which segment, from the segments in the segment list acquired in the list acquiring step, to request;
a segment requesting step of requesting, via the communication unit, the segment decided on in the deciding step, from the image capturing apparatus;
a segment acquiring step of acquiring the segment requested in the segment requesting step;
a determination step of determining a delay level for transmission of the segment based on the number of segments in the segment list; and
a notification step of providing a notification of the delay level determined in the determination step.

16. A non-transitory computer-readable storage medium storing a program for causing a computer to execute a control method for an information processing apparatus, the method comprising:
a communicating step of communicating, via a communication unit, with an image capturing apparatus, the communication unit configured to reproduce video data obtained by sequentially acquiring segments indicating divisional data of the video data obtained by image capturing of the image capturing apparatus;
a list requesting step of requesting, via the communication unit, a segment list in which information of segments of video data being captured by the image capturing apparatus is written, from the image capturing apparatus;
a list acquiring step of acquiring the segment list requested in the list requesting step;
a deciding step of deciding which segment, from the segments in the segment list acquired in the list acquiring step, to request;
a segment requesting step of requesting, via the communication unit, the segment decided on in the deciding step, from the image capturing apparatus;
a segment acquiring step of acquiring the segment requested in the segment requesting step; and
a calculating step of calculating a delay time for segment transmission based on a number of segments in the segment list.

17. A non-transitory computer-readable storage medium storing a program for causing a computer to execute a control method for an information processing apparatus, the method comprising:
a communicating step of communicating, via a communication unit, with an image capturing apparatus, the communication unit configured to reproduce video data obtained by sequentially acquiring segments indicating divisional data of the video data obtained by image capturing of the image capturing apparatus;
a list requesting step of requesting, via the communication unit, a segment list in which information of segments of video data being captured by the image capturing apparatus is written, from the image capturing apparatus;
a list acquiring step of acquiring the segment list requested in the list requesting step;
a deciding step of deciding which segment, from the segments in the segment list acquired in the list acquiring step, to request;
a segment requesting step of requesting, via the communication unit, the segment decided on in the deciding step, from the image capturing apparatus;
a segment acquiring step of acquiring the segment requested in the segment requesting step;
a determination step of determining a delay level for transmission of the segment based on the number of segments in the segment list; and
a notification step of providing a notification of the delay level determined in the determination step.

* * * * *